United States Patent [19]

Chometon et al.

[11] Patent Number: 4,492,291

[45] Date of Patent: Jan. 8, 1985

[54] DEVICE FOR DAMPING SHOCKS CAUSED BY MOVING HEAVY OBJECTS

[75] Inventors: Pierre Chometon, Saint Germain en Laye; Jacques Dollfus, Les Essarts-le-Roi, both of France

[73] Assignee: Commissariat a l'Energie Atomique, Paris, France

[21] Appl. No.: 347,378

[22] Filed: Feb. 10, 1982

[30] Foreign Application Priority Data

Feb. 13, 1981 [FR] France ................................ 81 02882

[51] Int. Cl.³ .......................... F16F 7/12; G21C 19/06
[52] U.S. Cl. ............................... 188/377; 52/393; 52/573; 206/591; 248/548; 252/633; 376/285
[58] Field of Search ............... 188/371, 372, 373, 374, 188/375, 376, 268, 377; 52/393, 573, 167, 662, 2; 293/133; 267/140.1, 140.4, 80, 81, 82; 248/548; 206/591, 521; 428/138, 137; 297/216; 376/285, 234; 252/631, 633, 627

[56] References Cited

U.S. PATENT DOCUMENTS

| 194,580 | 8/1877 | Clark | 52/393 |
|---|---|---|---|
| 3,305,452 | 2/1967 | Remoleur | 376/234 X |
| 3,412,628 | 11/1968 | De Gain | 188/377 X |
| 3,446,469 | 5/1969 | Whitten | 297/216 X |
| 3,760,753 | 9/1973 | Mertens | 252/633 X |
| 3,930,665 | 1/1976 | Ikawa | 188/376 X |
| 3,935,467 | 1/1976 | Gablin | 252/633 X |
| 4,104,118 | 8/1978 | Housman | 376/234 |
| 4,137,116 | 1/1979 | Miller | 428/138 X |
| 4,150,186 | 4/1979 | Kazama | 428/137 X |
| 4,190,276 | 2/1980 | Hirano et al. | 293/133 |
| 4,227,593 | 10/1980 | Bricmont et al. | 188/377 |
| 4,241,810 | 12/1980 | Newlon | 188/376 |
| 4,326,820 | 4/1982 | Uerpmann et al. | 252/633 X |
| 4,384,020 | 5/1983 | Beggs et al. | 428/138 |
| 4,428,700 | 1/1984 | Lennemann | 252/633 X |

FOREIGN PATENT DOCUMENTS

| 0058615 | 8/1982 | European Pat. Off. | 188/377 |
|---|---|---|---|
| 2212684 | 9/1973 | Fed. Rep. of Germany . | |
| 2613655 | 10/1977 | Fed. Rep. of Germany . | |
| 2840559 | 3/1980 | Fed. Rep. of Germany . | |
| 1451407 | 7/1965 | France . | |
| 928111 | 6/1963 | United Kingdom . | |

*Primary Examiner*—Douglas C. Butler
*Attorney, Agent, or Firm*—James E. Nilles

[57] ABSTRACT

The present invention relates to a device for damping impacts caused by the fall of heavy objects. This device comprises a group of deformable mechanical members arranged perpendicularly to a first plate and a second plate, a supplementary plate having substantially the same weight as each mechanical member being placed between the latter and the second plate. The supplementary plates are contiguous and each mechanical member has at least one predeformation at its end adjacent to the second plate. Application to the protection of discharge ponds against the fall of caskets.

4 Claims, 1 Drawing Figure

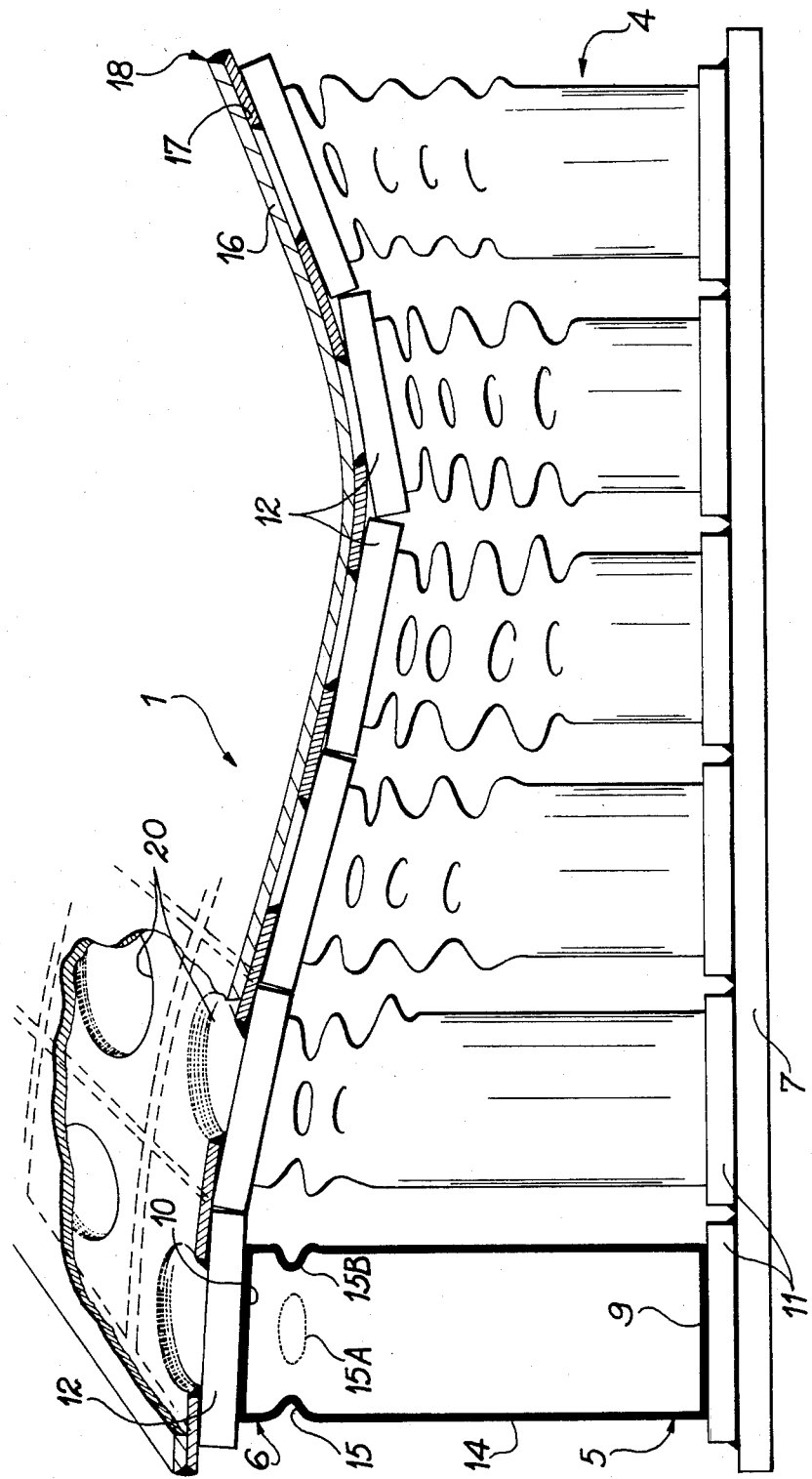

DEVICE FOR DAMPING SHOCKS CAUSED BY MOVING HEAVY OBJECTS

BACKGROUND OF THE INVENTION

The present invention relates to a device for damping the shocks caused by heavy objects and particularly as a result of the accidental dropping of transported packages into ponds for the discharge of radioactive products. These packages, which are also called coffins or flasks, will be termed caskets throughout the remainder of the description.

As it is never possible to completely exclude an operating fault in manipulating devices, it is necessary to take action against risks of the fracture or unsatisfactory operation of the casket attachment system at the time when the casket is located above the discharge pond and during its descent to the bottom of said pond.

A break or fracture to the system would lead to the casket dropping and during its impact with the pond wall would on the one hand make a hole in the wall and on the other, if the casket was very heavy, could break through the concrete floor on which the wall is located and cause unacceptable damage to adjacent structures.

Various solutions have already been proposed for obviating this risk of damage. For example an attempt has been made to place a cellular concrete layer between the bottom of the pond and the concrete floor. However, to obtain an effective action, the layer must be very thick (several meters in the case of a casket weighing approximately 120 tons). In addition, it is necessary to monitor the sealing of the pond, because cellular concrete is very sensitive to the action of water. Thus, the layer could form a contamination trap.

Another known solution consists of placing on the bottom of the pond tight metal shock absorbers having a honeycomb structure and whose cavities are filled with air. These cushioning layers are effective, but onerous. It may also be necessary to ballast or fix the cushioning layers to the bottom of the pond and insure their sealing. The reason is that, when filled with water, said layers are ineffective. Furthermore, such cushioning layers are only effective if they receive a vertical impact force and not an oblique impact force.

It has also been proposed to vertically arrange at the bottom of the pool water-filled, perforated tubes. These tubes do not deform in a homogenous manner and are subject to a counterpressure at the time of the impact produced on the one hand by a relatively slow escape of the water through the tube orifices and on the other to the incompressibility of the water contained in the tube.

BRIEF SUMMARY OF THE INVENTION

The present invention relates to a device obviating the aforementioned disadvantages and which is also effective in the case of oblique impacts or shocks.

According to the main feature of the device according to the invention it comprises at least one group of deformable mechanical members having a first end connected to a first plate and a second end connected to a second plate, the mechanical members being arranged perpendicularly to said plates, wherein a supplementary plate, whose weight is substantially the same as that of each mechanical member, is positioned between the latter and the second plate, the supplementary plates being contiguous and each mechanical member has at least one predeformation in the vicinity of its second end connected to the second plate.

Thus, as the supplementary plates are contiguous and connected to the upper plate, they remain in contact with one another, even in the case of an oblique impact. Thus, each mechanical member can freely deform without coming into contact with adjacent members.

The predeformations are made so that they may avoid a pressure peak at the time of impact.

According to another feature of the device of the invention the dimensions of the tubes are calculated so that, when used in a liquid, the part of overpressure transmitted by the liquid is negligible.

According to another feature of the device according to the invention, the second plate comprises a perforated sheet fixed to the supplementary plates and an unperforated sheet fixed by its edges to the face of the perforated sheet opposite to the supplementary plates.

The perforated sheet provides a connection between the supplementary plates in such a way that they remain in contact with one another and maintain the spacing between the mechanical members at the time of impact, no matter what is the direction of the impact. The unperforated sheet has a protective function with respect to the perforated sheet, being able to slide with respect to the latter and prevent puncturing thereof.

DESCRIPTION OF THE DRAWING AND PREFERRED EMBODIMENTS

The invention is described in greater detail hereinafter relative to non-limitative embodiments of the invention and with reference to the single drawing, which is a vertical sectional, part perspective, diagrammatic view of a damping device according to the invention after it has been subjected to a shock or impact caused by the dropping of a storage casket.

In the drawing the device, carrying the general reference 1, is shown as it would appear on the bottom of a pond. The device 1 comprises a group of vertically arranged tubes 4, whose bottom 5 and top 6 are respectively connected with a first or lower plate 7 and a second or upper plate 18.

Each of the tubes 4 is filled with air and is sealed at its bottom by a welded metal plug 9 to which is welded a lower square plate 11, and it is similarly sealed at its top by a welded plug 10 to which is welded an upper square plate 12. The respective square plates 9 and 10 are themselves fixed by welding to plate 7 and plate 18. Plates 12 or supplementary plates have sides whose length exceeds the diameter of the tubes and which are contiguous. The side wall 14 of each tube has one or more predeformations 15 obtained by squeezing or nipping in an area adjacent to the top. These predeformations ensure that the tube is deformed by crushing from the top in accordance with its own vibration mode under the action of an impact. As in the present case the tube deforms in three directions, it is important to have three predeformations 15, 15A and 15B, located in the same horizontal plane and displaced from one another.

It is also possible to see the upper plate 18 which, according to the invention, comprises an upper unperforated sheet 16 joined by its edges to a perforated sheet 17, e.g. by welding.

Sheet 17 has perforations 20 in the form of circular holes with a diameter substantially equal to that of tubes 4 and positioned roughly concentrically to the latter. Perforated sheet 17 is welded to the supplementary plates 12 at the edges of perforations 20.

In the present embodiment the device has received an impact at a point in the right hand portion of the drawing. The two sheets 16 and 17 have deformed, whilst crushing to a greater or lesser extent the tubes positioned below them. The thickness of the unperforated sheet 16 is such that it protects the perforated sheet 17 at the time of impact by being able to slide with respect to the latter and prevent the puncturing of the perforated sheet under the effect of the impact. Thus even in the case of an oblique impact, the perforated sheet 17 remains joined to the supplementary plates 12, because it is the unperforated sheet which slides with respect to the remainder of the device. The thickness of the perforated sheet is such that it continues to provide a connection between the plates 12 after the impact, in order that the latter remain in contact with one another, no matter what the direction of the impact relative to the axis of the tubes. Thus, each tube can deform without there being any risk of it coming into contact with adjacent tubes, which makes it possible to absorb a maximum amount of energy by crushing. There is no need for the supplementary plates 12 to be perfectly continguous. It is merely necessary for them to so come together during movement as to ensure that the tubes do not come into contact with one another.

Such a disposal also permits the energy of impact to be distributed over a large number of tubes.

Finally, the predeformations such as 15, 15A and 15B are indispensable for ensuring that the tube is crushed or flattened for absorbing the impact energy.

The size of the predeformations must be large enough to avoid a pressure peak, but not too large however because a too large deformation could affect the stability of the tubes under static load.

In the present embodiment the dimensions of the shock absorber have been calculated so as to be able to solve the following problem. It is desired to damp a drop of 2.2 m in air and of 10 m in water of a 116 ton casket with a damping travel of 1 m (i.e. a reduction in the shock absorber height by corrugating or folding the sidewall of the tubes by 1 m).

The impact conditions of the casket are such that the angle of the velocity vector with the vertical of the centre of gravity of the casket can reach 10° and the position of the bottom of the casket is such that it is in contact with the shock absorber along an edge. The lower face can be inclined by 45° relative to the horizontal in the least favourable case. The instantaneous maximum load does not exceed one of the following values in any random area:

16 MN/2.4 m$^2$
19.4 MN/4.8 m$^2$
40 MN/12 m$^2$

The maximum pressure retransmitted beneath the 1.65 m thick, reinforced concrete floor must not exceed 10 bars in the most highly stressed area.

In addition, under normal operating conditions, the shock absorbers must be able to withstand without deformation a casket approach speed of 0.5 m/mn. Moreover, the result of the hydrostatic lifts exerted on the device is such that the latter is immobilized at the bottom of the pool as a result of its own weight, so that there is no need to provide a fastening on the pool bottom or any separate ballasting.

This problem has been solved according to the invention by covering the bottom of the pool with a shock absorber according to the drawing, formed from tubes having an outside diameter of 408 mm, a predeformed sidewall of thickness 4 mm, each tube being sealed by two 15 mm thick metal plugs to which are welded a 15 mm lower plate and a 30 mm thick supplementary plate. The supplementary plates are welded to a continuous 16 mm thick upper plate and the tubes are uniformal distributed in accordance with a density of 4 tubes/m$^2$. The height of the tubes is 1515 mm. The metal used is stainless steel Z2CN 15 10 (304 L).

In order to predeform the tubes they are introduced horizontally into a clamp, whose lower fixed jaw has a V-shape and a rounded top formed by two blades cutting at an angle of 60° and whose upper movable jaw is a straight cutting blade, the thickness of the cutting edge of the three blades being 30 mm. A suitable load is applied to the movable jaw for obtaining on the lateral surface of the tube, approximately 20 cm from the top, a triangular predeformed area positioned approximately 20 cm from the top and whose maximum deflection is approximately 40 mm.

The device according to the invention offers interesting advantages, particularly with regards to its strength in the case of an oblique impact. Thus, the thicknesses of the perforated and unperforated sheets forming the upper plate 18 are such that, even in the case of an oblique shock, the perforated sheet deforms whilst remaining connected to the supplementary plates 12, which remain substantially contiguous and enable the tubes to freely deform along their vertical axis. Thus, the device absorbs a large part of the energy due to the impact and prevents a certain number of disadvantages occurring in the prior art, e.g. bouncing or rebound of the casket.

The invention is obviously not limited to the embodiment described and varous variants are possible without passing beyond the scope of the invention.

Thus, the hollow cylinders can be replaced by hollow truncated cones or it is also possible to use several groups of mechanical members according to the invention arranged in superimposed manner, the groups being linked by means of intermediate plates.

When used in water the tubes must be liquid-tight. The device such as above-described leads to a good sealing, but it may be advantageous to fill them with a liquid-tight crushable material, preferably a lightweight material such as expanded polystryrene. Thus, the tubes filled with this material remain effective, even if their wall is no longer liquid-tight.

It is also possible to use in air mechanical members (cylinders or truncated cones), whose sidewall may be perforated.

A shock absorbing device according to the invention can be constructed in such a way that it is fixed to a movable or stationary structure or it is possible to provide a movable device (e.g. simply placed on the bottom of a pond), which can be moved from one installation to another. It is also possible to produce such a device in the form of a single block of relatively large size or to juxtapose a plurality of smaller shock absorbers.

Finally, if in the embodiment described hereinbefore the device is positioned vertically in order to protect the bottom of a pond, it is possible to envisage applications in which the first and second plates surrounding the deformable members have a random orientation, the second plate and supplementary plates still being positioned on the side exposed to the impacts or shocks.

The device according to the invention can be used in all cases where there is a risk of heavy objects dropping or causing a shock either in a liquid medium or in air.

What is claimed is:

1. A device for damping shocks due to impacts by heavy moving objects, comprising:
   (A) a plurality of substantially identical tubular members, each of which has
      (1) an axis,
      (2) a pair of axially opposite ends, and
      (3) a radially deformed portion intermediate its ends that allows the member to be endwise crushed by a substantially axial compressive impact;
   (B) a supporting plate to which each of said members is secured at one of its ends and from which said members all project in one direction, in radially spaced relation to one another;
   (C) a plurality of substantially thick supplementary plates, one for each of said members, each
      (1) rigidly secured to the other end of its member, normal to the axis thereof, and
      (2) having edge portions spaced radially outwardly from its member that oppose edge portions of supplementary plates on adjacent members to maintain the members radially spaced from one another notwithstanding axial crushing deformation of them;
   (D) a bendingly deformable perforated sheet overlying said supplementary plates and having a plurality of apertures, one for each said member, each aperture being substantially coaxial with its member;
   (E) means at the edge of each said aperture bonding the perforated sheet to the supplementary plate beneath the aperture; and
   (F) a substantially imperforate sheet overlying said perforated sheet and having edge portions substantially coterminous with those of the perforated sheet and bonded to them, so that portions of said imperforate sheet and said perforated sheet that are inward of their said edge portions are flatwise slidable relative to one another.

2. An impact damping device for protecting a wall or the like from shocks due to heavy objects moving toward a surface thereof, said device comprising:
   (A) a supporting plate for overlying said surface;
   (B) a plurality of substantially identical elongated members, each of which is lengthwise crushable under a substantially endwise compressive impact, each of said members being secured at one of its ends to the supporting plate, and all of said members projecting in one direction from the supporting plate and being laterally spaced apart;
   (C) a plurality of supplementary plates, one for each of said members, each
      (1) rigidly secured to the other end of its member, substantially parallel to the supporting plate, and
      (2) having edge portions spaced laterally outwardly from its member that oppose edge portions of supplementary plates on adjacent members to maintain the members laterally spaced apart notwithstanding crushing deformation of them;
   (D) a bendingly deformable perforated sheet overlying said supplementary plates and having a plurality of apertures, one for each said member, each aperture being substantially coaxial with its member;
   (E) bonding means confined to zones at the edge of said apertures whereby said perforated sheet is secured to each of said supplementary plates;
   (F) a substantially imperforate sheet overlying said perforated sheet; and
   (G) connecting means substantially confined to adjacent edge portions of said perforated sheet and said imperforate sheet whereby they are maintained in flatwise overlying relationship but are slidable relative to one another at their portions inward of said edge portions.

3. The impact damping device of claim 2, further characterized by:
   each of said members
      (1) being tubular and
      (2) having a radially deformed portion intermediate its ends that renders it lengthwise crushable.

4. The impact damping device of claim 3, further characterized by:
   each of said members further being
      (3) cylindrical and
      (4) made of stainless steel.

* * * * *